J. H. WRIGHT.
Weighing Apparatus.
No. 209,099.  Patented Oct. 15, 1878.
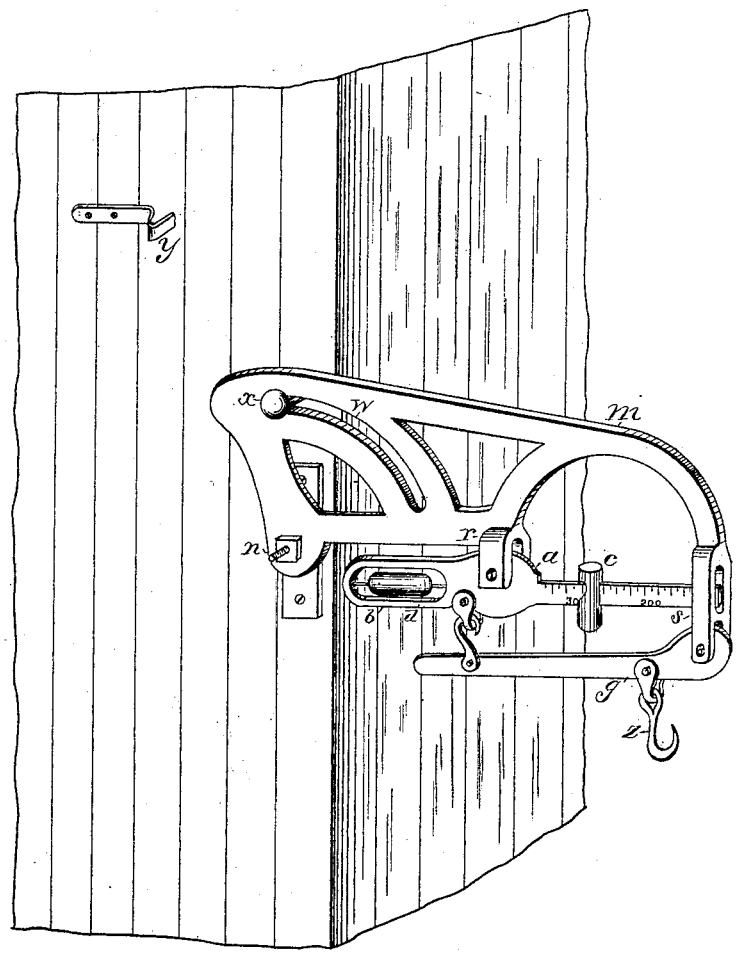
Attest:
Arthur Stimson.
R. J. Pierson.
Inventor.
Josiah H. Wright
By Thomas G. Orwig,
Attorney.

UNITED STATES PATENT OFFICE.

JOSIAH H. WRIGHT, OF DES MOINES, IOWA.

IMPROVEMENT IN WEIGHING APPARATUS.

Specification forming part of Letters Patent No. 209,099, dated October 15, 1878; application filed April 30, 1877.

*To all whom it may concern:*

Be it known that I, JOSIAH H. WRIGHT, of Des Moines, in the county of Polk and State of Iowa, have invented an Improved Weighing Apparatus, of which the following is a specification:

The object of my invention is to adapt a steelyard for weighing light and heavy articls, and to suspend it in such a manner that it can be readily folded out of the way when not in use.

It consists in combining a multiplying-lever with the arms of the weigh-beam, and in an adjustable bracket for suspending and carrying the complete steelyard, all as hereinafter fully set forth.

My drawing is a perspective view, illustrating the construction, suspension, and operation of my complete weighing apparatus.

$a$ is the graduated long arm of a weigh-beam. $b$ is an open rearward extension of the short arm of the same beam. $c$ is a sliding weight on the long arm $a$. $d$ is an adjustable balance-weight mounted in the rear end of the short arm. $g$ is a multiplying-lever suspended from a loop that has a bearing near the fulcrum of the weighing-beam $a\ b$. $m$ is an adjustable skeleton bracket, cast complete in one piece, and pivoted to a wagon, wall, post, or any suitable support, by means of a bearer, $n$, that is rigidly fastened against the support. $r$ is a bifurcated beam-bearer formed integral with the bracket $m$ at its bottom edge and near its longitudinal center. $s$ is the slotted front end of the bracket, into which the free end of the long arm $a$ of the weigh-beam enters to be restricted in its oscillating movements. The lower end of this portion $s$ is bifurcated and forms a bearing for the multiplying-lever $g$. $w$ is a slot formed in the rear and upper portion of the bracket, and is concentric with the pivotal and bearing bolt $n$. $x$ is a fixed pin projecting from the wall or support at right angles and through the curved slot $w$, to aid in supporting the bracket and governing its movements as it is folded or turned back and forth on its pivot $n$. $y$ is a spring-latch fixed to the wall in such a position as to allow its free end to pass through, engage, and lock the bracket in a vertical position, as required when the apparatus is not in practical use.

$z$ is a hook suspended from the multiplying-lever $g$ by means of a loop, to which the articles to be weighed are attached in any suitable way.

The gravity of any article thus suspended from the multiplying-lever $g$ will be transmitted to the short arm of the weigh-beam $a\ b$, and the sliding weight $c$, when properly adjusted on the graduated beam $a$, will poise the suspended body, preserve the equilibrium of the apparatus, and indicate the weight of the article, object, or matter depending from the hook $z$.

My invention is specially adapted to be attached to a delivery ice-wagon to weigh out varying quantities from the bulk supply as required by different customers; but it can be advantageously used by farmers, butchers, grocers, manufacturers, merchants, and all persons who have occasion to ascertain the weight of their products and articles of merchandise.

I claim as my invention—

1. The adjustable bracket $m$, having a pivotal center, $n$, a concentric slot, $w$, a beam-bearer, $r$, and a lever-bearer, $s$, formed complete in one piece, substantially as and for the purposes shown and described.

2. As an improved article of manufacture, the weighing apparatus composed of the weigh-beam $a\ b$, having adjustable weights $c$ and $d$, the hinged lever $g$, having a depending hook, $z$, and the adjustable bracket $m\ n\ w\ r\ s$, substantially as and for the purposes shown and described.

JOSIAH H. WRIGHT.

Witnesses:
 TOM BRADEN,
 ARTHUR STIMSON.